Patented Feb. 14, 1928.

1,659,360

UNITED STATES PATENT OFFICE.

IVAN GUBELMANN, HENRY J. WEILAND, AND OTTO STALLMANN, OF SOUTH MILWAUKEE, WISCONSIN, ASSIGNORS TO THE NEWPORT COMPANY, OF CARROLLVILLE, WISCONSIN, A CORPORATION OF DELAWARE.

1,3-DIAMINO-2-HYDROXY ANTHRAQUINONE AND PROCESS OF MAKING THE SAME.

No Drawing.   Application filed November 29, 1926. Serial No. 151,593.

We have discovered that 3'-5'-diamino-4'-hydroxy-ortho-benzoyl-benzoic acid, which is described in our co-pending application entitled 3', 5'-diamino-4'-hydroxy-ortho-benzoyl-benzoic acid and a process of making the same, Serial No. 151,592, filed November 29, 1926, under certain conditions loses one molecule of water and closes the ring to form 1,3 diamino-2-hydroxy anthraquinone. The reaction is shown by the following chemical equation:

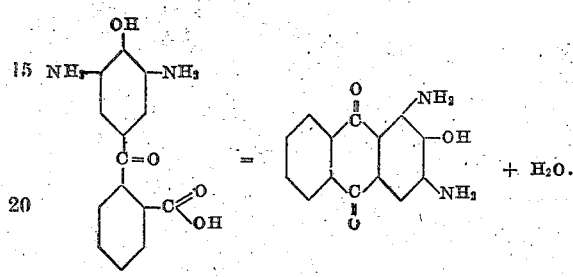

The elimination of water from the 3'-5'-diamino-4'-hydroxy-ortho-benzoyl-benzoic acid may be brought about by suitable dehydrating agents, such as sulfuric acid. We do not, however, wish to limit our method to any specific concentration of acid or temperature, since it has been found that the elimination of water can be effected under various conditions of concentration and temperature.

1,3-diamino-2-hydroxy-anthraquinone in its crude form is a black crystalline powder. It can be recrystallized from alcohol and is then obtained as dark red shining crystals. These crystals when heated up in a capillary tube start to sublime at 285° C. and melt under decomposition at 300-305° C. The compound is slightly soluble in hot water, imparting a red color to the water, fairly soluble in boiling alcohol and more soluble in nitro-benzene. It is soluble in dilute caustic soda or ammonia solution with a dark blue color. A solution of the compound in dilute caustic soda produces with sodium hydrosulfite a dark red color.

Without limiting our invention to any particular procedure, the following example, in which parts by weight are given, illustrates the application of our invention in the preferred form:

Into 1088 parts of sulfuric acid (66° Bé.) are added 272 parts of 3'-5'-diamino-4'-hydroxy-ortho-benzoyl-benzoic acid. The mass is heated up to 175-185° C. and held at that temperature for two hours. It is then cooled to 100° C. and 1000 parts of water are added over a period of two hours. The diluted mass is cooled to 40-50° C. and poured into 8000 parts of hot water (80-90° C.), stirred for 4-5 hours, cooled to 25° C. and filtered. The filter cake is washed on the filter with about 1000 parts of cold water until the filter cake is practically free of mineral acid. The cake is suspended in 4000 parts of hot water (90-95° C.) and such an amount of caustic soda solution added as will cause the color of the mass to change from red to blue. A small amount of acetic acid is now added until the blue color disappears and the mass is red again. The precipitated product, 1,3 diamino-2-hydroxy-anthraquinone is filtered off at 80-90° C., washed on the filter until free of sulfate and dried at 100° C. The crude product may be purified by crystallizing from alcohol.

We are aware that numerous details of the process may be varied through a wide range without departing from the spirit of this invention and we do not desire limiting the patent granted hereon otherwise than as necessitated by the prior art.

We claim as our invention:

1. The process of preparing 1,3 diamino-2-hydroxy-anthraquinone from 3'-5'-diamino-4'-hydroxy-ortho-benzoyl-benzoic acid by means of concentrated sulfuric acid as dehydrating agent.

2. The process of preparing 1,3-diamino-2-hydroxy-anthraquinone from 3'-5'-diamino-4'-hydroxy-ortho-benzoyl-benzoic acid by eliminating water therefrom by means of sulfuric acid as the dehydrating agent, diluting up the condensation mass with water, filtering to remove the sulfuric acid and washing the filtered product with water.

In testimony whereof we have hereunto subscribed our names.

IVAN GUBELMANN.
HENRY J. WEILAND.
OTTO STALLMANN.